(12) United States Patent
Ito

(10) Patent No.: US 6,249,864 B1
(45) Date of Patent: Jun. 19, 2001

(54) REMOVABLE MEDIUM PROCESSING APPARATUS AND RECORDING AND REPRODUCING APPARATUS

(75) Inventor: Masahiro Ito, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/139,518

(22) Filed: Aug. 25, 1998

(30) Foreign Application Priority Data

Jan. 28, 1998 (JP) .................................................. 10-015753

(51) Int. Cl.[7] ...................................................... G06F 9/445
(52) U.S. Cl. ................................................................ 713/2
(58) Field of Search .................................. 713/1, 2, 100

(56) References Cited

U.S. PATENT DOCUMENTS

| | | | |
|---|---|---|---|
| 5,093,915 | * 3/1992 | Platteter et al. | 713/2 |
| 5,542,082 | * 7/1996 | Solhjell | 711/115 |
| 5,692,190 | * 11/1997 | Williams | 713/2 |
| 5,694,600 | * 12/1997 | Khenson et al. | 713/2 |
| 5,715,456 | * 2/1998 | Bennett et al. | 713/2 |
| 6,016,402 | * 1/2000 | Thomas et al. | 710/8 |
| 6,035,395 | * 3/2000 | Saito | 713/1 |

FOREIGN PATENT DOCUMENTS

WO 97/45788    12/1997  (WO).

* cited by examiner

*Primary Examiner*—Thomas M. Heckler
(74) *Attorney, Agent, or Firm*—Greer, Burns & Crain, Ltd.

(57) ABSTRACT

A built-in type recording and reproducing apparatus 20 forms medium information 52 including a format kind by reading out and analyzing system concerning information recorded on a medium 22 when an apparatus power source is turned on in an inserted state of the medium 22, and receives and transfers a command from an upper BIOS 32. When the apparatus power source is turned on, the BIOS 32 of an upper apparatus 10 sends a command to the recording and reproducing apparatus 20, obtains the medium information 52, executes a boot process, and establishes an accessible state of the recording and reproducing apparatus 20. A plug-in type recording and reproducing apparatus 90 reads out and analyzes the system concerning information on the medium and forms medium information 102 when the medium 22 is inserted, and transfers the medium information in response to a request command from an upper OS 56.

28 Claims, 17 Drawing Sheets

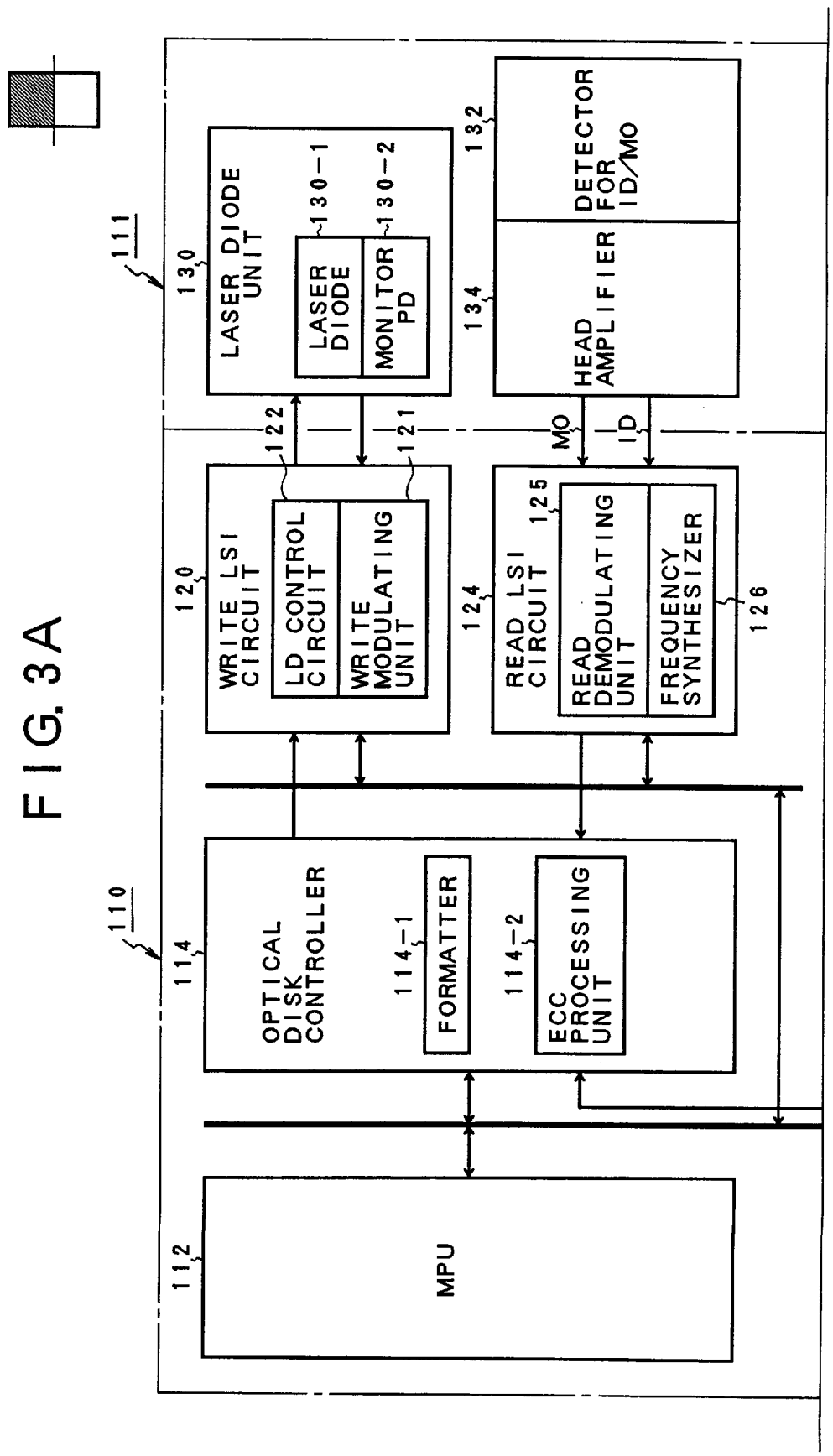

FIG. 7

| CODE | CONTENTS |
|---|---|
| 00h | NON-BOOTABLE PARTITION |
| 20h | BOOTABLE PARTITION |

| COMMAND No. | FORMAT NAME |
|---|---|
| 00h | Empty |
| 01h | DOS 12-bit FAT |
| 02h | XENIX root |
| 03h | XENIX user |
| 04h | DOS 16-bit <32M |
| 05h | Extened |
| 06h | DOS 16-bit ≧32M |
| 07h | OS/2 HPFS |
| 08h | AIX |
| 09h | AIX bootable |
| 0Ah | OS/2 Boot Manag |
| 40h | Venix 80286 |
| 51h | Novell? |
| 52h | Microport |
| 63h | GNU HURD |
| 64h | Novell Netware |
| 65h | Novell Netware |
| 75h | PC/IX |
| 80h | Old MINIX |
| 81h | Linux/MINIX |
| 82h | Linux swap |
| 83h | Linux native |
| 93h | Amoeba |
| 94h | Amoeba BBT |
| A5h | BSD/386 |
| B7h | BSDI fs |
| B8h | BSDI swap |
| C7h | Syrinx |
| DBh | CP/M |
| E1h | DOS access |
| E3h | DOS R/O |
| F2h | DOS secondary |
| FFh | BBT |

78 — COMMAND No.  FORMAT NAME — 80

REMOVABLE MEDIUM PROCESSING APPARATUS AND RECORDING AND REPRODUCING APPARATUS

BACKGROUND OF THE INVENTION

The present invention relates to removable medium processing apparatus and recording and reproducing apparatus which are used to activate a medium accessing function of an upper apparatus when a power source of the recording and reproducing apparatus using a removable medium such as optical disk, magnetic disk, floppy disk, or the like is turned on or the medium is inserted into the apparatus. More particularly, the invention relates to processing apparatus and recording and reproducing apparatus for a removable medium, in which firmware of the recording and reproducing apparatus reads out and analyzes medium information which is necessary to start access of the removable medium and responds to a command from the upper apparatus.

In recent years, various kinds of removable apparatuses such as magnetic tape apparatus, CD drive, DVD drive, MO drive, floppy disk apparatus, large capacity floppy apparatus, and the like which can be used for various kinds of computer apparatuses, a television, a video deck, and the like have appeared. It is also necessary to cope with various kinds of logic formats by one drive in correspondence to various interfaces such as IDE, SCSI, UBS, IEEE1394, and the like. However, in the present situation, it is impossible to easily interchange a control of the logic format by the OS of an upper apparatus with respect to various logic formats which media inserted to the removable apparatus have.

Hitherto, as for a basic input output system BIOS known as a basic input output system provided for the upper apparatus, any basic input output system BIOS recognizes a partition table of the medium, executes a bootup process, and transfers a control to a system program, thereby allowing a boot process to be executed. That is, the basic input output system BIOS fixedly sets medium information necessary for the bootup of the logic format or the like of the medium by its own set-up menu. Therefore, when a power source of the upper apparatus is turned on in a state in which the medium has been inserted in the removable apparatus, the basic input output system BIOS installed in a mother board of the upper apparatus executes the bootup process on the basis of the medium information set by the set-up menu, loads a boot program from the medium into a main storage of the upper apparatus, executes the boot process by the OS, and establishes an enable state of the input/output access to/from the removable apparatus. The reason why the basic input output system BIOS executes the bootup process serving as a head portion of the boot process without executing the boot process itself is because a memory capacity (capacity of an ROM) on the mother board in which the basic input output system BIOS has been installed is small.

In recent years, however, one removable apparatus has supported a plurality of kinds of logic formats held by a plurality of operating systems OS which operate in the upper apparatus. It is a situation in which the bootup by the conventional basic input output system BIOS in which the medium information has fixedly been set by the set-up menu cannot easily cope with a variety of many logic formats. That is, the logic formats of the media are fixedly set by the set-up menu of the basic input output system BIOS. Therefore, when the medium format is different, even if the basic input output system BIOS executes the bootup process, an error occurs in a menu display of a program list when the boot program is loaded from the medium, so that the booting process cannot be executed. In case of inserting the removable apparatus into a computer apparatus (plug-in manner) and using, when a power source of the plug-in removable apparatus is turned on and the medium is inserted, the operating system OS recognizes that the inserted medium is a medium having the logic format established by the bootup process by the basic input output system BIOS at the time of turn-on of the power source and the boot process by the execution of the boot program of a hard disk drive HDD. Consequently, when the logic format of the inserted medium is different, the access to the removable apparatus by the operating system OS causes an error and cannot be supported.

SUMMARY OF THE INVENTION

According to the invention, there are provided a removable medium processing apparatus and a recording and reproducing apparatus, in which an upper apparatus can easily cope with various kinds of logic formats which removable media have.

A removable medium processing apparatus of the invention comprises a recording and reproducing apparatus and an upper apparatus. The recording and reproducing apparatus (also referred to as a memory apparatus) is mounted on the apparatus main body. When a power source of the apparatus is turned on in a state where a removable medium has been inserted, the recording and reproducing apparatus reads out and analyzes system information recorded on the medium, forms medium information, and transfers the medium information in response to a request command from the upper apparatus. When the power source of the apparatus is turned on, the upper apparatus supplies a command to the recording and reproducing apparatus, obtains the medium information, executes a boot process on the basis of the obtained medium information, and establishes an accessible state of the recording and reproducing apparatus. According to the removable medium processing apparatus of the invention, when the power source of the apparatus is turned on, the medium information including at least a format kind is formed on the recording and reproducing apparatus side, the formed medium information is transferred in response to the command from the upper apparatus before the bootup process is executed, the medium information can be obtained in the upper apparatus without executing any special operation such as reading, analysis, or the like of the medium, and the upper apparatus can easily cope with various kinds of formats of the medium side.

The recording and reproducing apparatus comprises: a system information reading unit for reading out system information which has previously been recorded from a predetermined area of the medium when the power source of the apparatus is turned on; a medium information forming unit for analyzing the system information and forming medium information necessary for the bootup process of the upper apparatus; and a command processing unit for transferring the medium information in response to a medium information request command received from the upper apparatus when the power source of the apparatus is turned on. The system information reading unit reads out a head logic block address LBA0 of the medium and caches it into a buffer. The medium information forming unit analyzes a logic block address LBA of the medium cached in the buffer and forms the medium information. In this instance, the medium information forming unit forms the medium information so as to be divided into one or a plurality of partitions. The partition defines a logical virtual medium by dividing a medium area into one or a plurality of areas. When the power source of the apparatus is turned on, the medium information forming unit forms, for example, partition information indicative of a partition area, format information indicative of a format kind of the partition, and boot information indicative of whether a boot program which is loaded to the upper apparatus and is executed has been stored or not. In this instance, the removable medium has, for example, a PC/AT corresponding medium format. When the power source of the apparatus is turned on, the medium information forming unit forms partition information by analyzing a partition start address, a partition end address, a partition head physical sector, and the total number of partition allocation sectors of the head logic block address of the removable medium, forms format information by analyzing a system indicator of the logic block address, and further forms boot information by analyzing a boot indicator of the logic block address. The format information included in the medium information is a command number defined by predetermined table information of a PC/AT corresponding format.

The upper apparatus comprises: a bootup processing unit for obtaining the medium information by sending a medium information request command to the recording and reproducing apparatus when the power source of the apparatus is turned on, and for executing the bootup process on the basis of the partition information, format information, and boot information included in the obtained medium information; a boot processing unit for executing the boot process by a boot program loaded from the recording and reproducing apparatus by the bootup processing unit; and an access processing unit for executing an input/output access to/from the recording and reproducing apparatus after completion of the boot process. The bootup processing unit is realized by a basic input output system (BIOS) provided for a mother board of the upper apparatus. The boot processing unit and access processing unit are realized by the operating system (OS) of the upper apparatus. When the recording and reproducing apparatus supports an ATA interface, the basic input output system (BIOS) issues an identify command as a request command of the medium information at the time of the power-on of the apparatus. When the recording and reproducing apparatus supports an ATAPI interface, the basic input output system (BIOS) issues an inquiry command as a request command of the medium information at the time of the power-on of the apparatus.

The recording and reproducing apparatus is externally connected (plug-in) to the upper apparatus. When a removable medium is inserted to the apparatus after the self power source was turned on, the apparatus forms the medium information by reading out and analyzing system information recorded on the medium and transfers the medium information in response to a request command from the upper apparatus. When receiving a connection notification indicative of the insertion of the medium in the recording and reproducing apparatus in the operating state after completion of the power source of the apparatus was turned on, the upper apparatus sends a command to the recording and reproducing apparatus, obtains the medium information, and establishes an accessible state of the recording and reproducing apparatus on the basis of the obtained medium information. According to such a plug-in type removable medium processing apparatus of the invention, when the power source of the plug-in recording and reproducing apparatus is turned on and the medium is inserted, medium information including at least a format kind is formed, the formed medium information is sent in response to a command from the upper apparatus which received a connection notification of the plug-in apparatus, the medium information can be obtained in the upper apparatus without executing any special operation such as reading, analysis, or the like of the medium. The upper apparatus can easily cope with various kinds of formats of the inserted medium side.

Similar to the built-in type, the plug-in type recording and reproducing apparatus comprises: a system information reading unit for reading out previously recorded system information from a predetermined area of a medium when the medium is inserted; a medium information forming unit for analyzing the system information and forming medium information necessary for an accessing process of the upper apparatus; and a command processing unit for transferring the medium information in response to a medium information request command received from the upper apparatus. The system information reading unit of the recording and reproducing apparatus which is inserted in a plug-in manner reads out the head logic block address of the medium and caches it into the buffer, and the medium information forming unit analyzes the logic block address of the medium cached in the buffer and forms the medium information. The medium information forming unit forms the medium information so as to be divided into one or a plurality of partitions. When the medium is inserted, the medium information forming unit forms partition information indicative of a partition area and format information indicative of a format kind of partition. In the plug-in type removable medium processing apparatus as well, in case of the PC/AT corresponding medium format, when the medium is inserted, the medium information forming unit forms the partition information by analyzing the partition start address, partition end address, partition head physical sector, and the total number of partition allocation sectors of the head logic block address of the removable medium and, further, forms the format information by analyzing the system indicator of the head logic block address. The format information included in the medium information is the command number defined by the predetermined table information of a PC/AT corresponding format. The format information included in the medium information includes the unformatted command number.

The upper apparatus in the removable medium processing apparatus of the plug-in type has an access processing unit for sending a medium information request command to the recording and reproducing apparatus and obtaining the medium information when recognizing a connection of the recording and reproducing apparatus, and for establishing an accessible state to the recording and reproducing apparatus on the basis of the partition information and format information included in the obtained medium information. The access processing unit is realized by the operating system OS of the upper apparatus. When an unformatted state or an unknown format of the partition which is set in an active state is recognized from the medium information, the formatting process is executed as necessary, thereby establishing the accessible state. In case of supporting the ATA interface by the recording and reproducing apparatus, when the connection of the recording and reproducing apparatus is recognized, the operating system OS issues an identify command as a request command of the medium information. In case of supporting the ATAPI interface, when the connection of the recording and reproducing apparatus is recognized, the operating system OS issues an inquiry command as a request command of the medium information.

The above and other objects, features, and advantages of the present invention will become more apparent from the following detailed description with reference to the drawings.

BRIEF DESCRIPTION OF THE DRAWINGS

FIGS. 3A and 3B are block diagrams of an MO drive in FIG. 2;

FIG. 7 is an explanatory diagram of a boot indicator in FIG. 6;

FIG. 8 is an explanatory diagram of a format table in which a command number and a format name which are stored in a system indicator in FIG. 6 have been defined;

DETAILED DESCRIPTION OF THE PREFERRED EMBODIMENTS (Drive Built-in Type)

Figure 1:
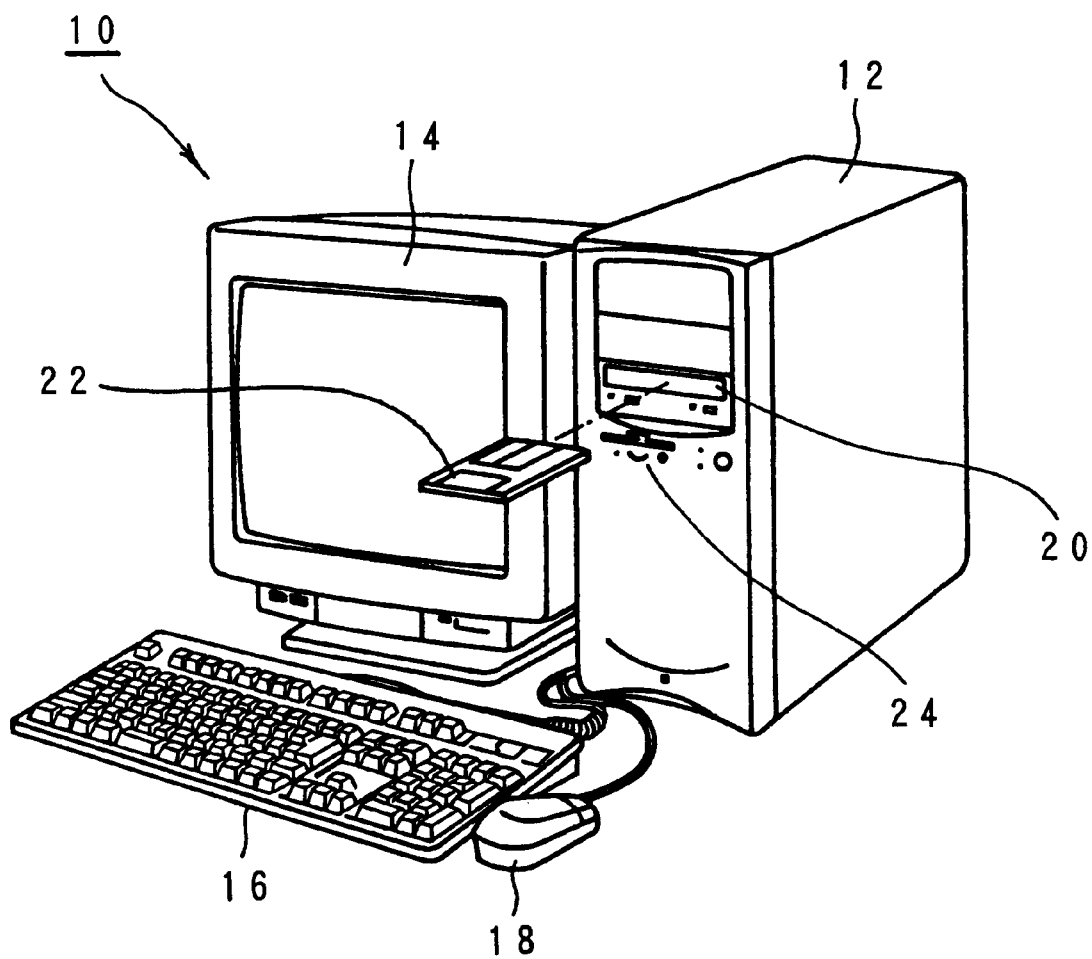
FIG. 1 is an explanatory diagram of an apparatus construction of a drive built-in type.

FIG. 1 is an explanatory diagram of an apparatus construction to which a processing apparatus of a removable medium according to the invention is applied. FIG. 1 shows an example in the case where a magnetooptic disk drive is built in as a recording and reproducing apparatus of a removable medium. A personal computer 10 is constructed by a personal computer main body 12, a display 14, a keyboard 16, and a mouse 18. The personal computer main body 12 has therein an MO drive (magnetooptic disk drive) 20. An MO cartridge 22 serving as a removable medium is inserted into the personal computer main body 12 and an access for recording and reproduction is executed. An FD drive (floppy disk drive) 24 which uses a floppy disk as a removable medium is also provided for the personal computer main body 12.

Figure 2:
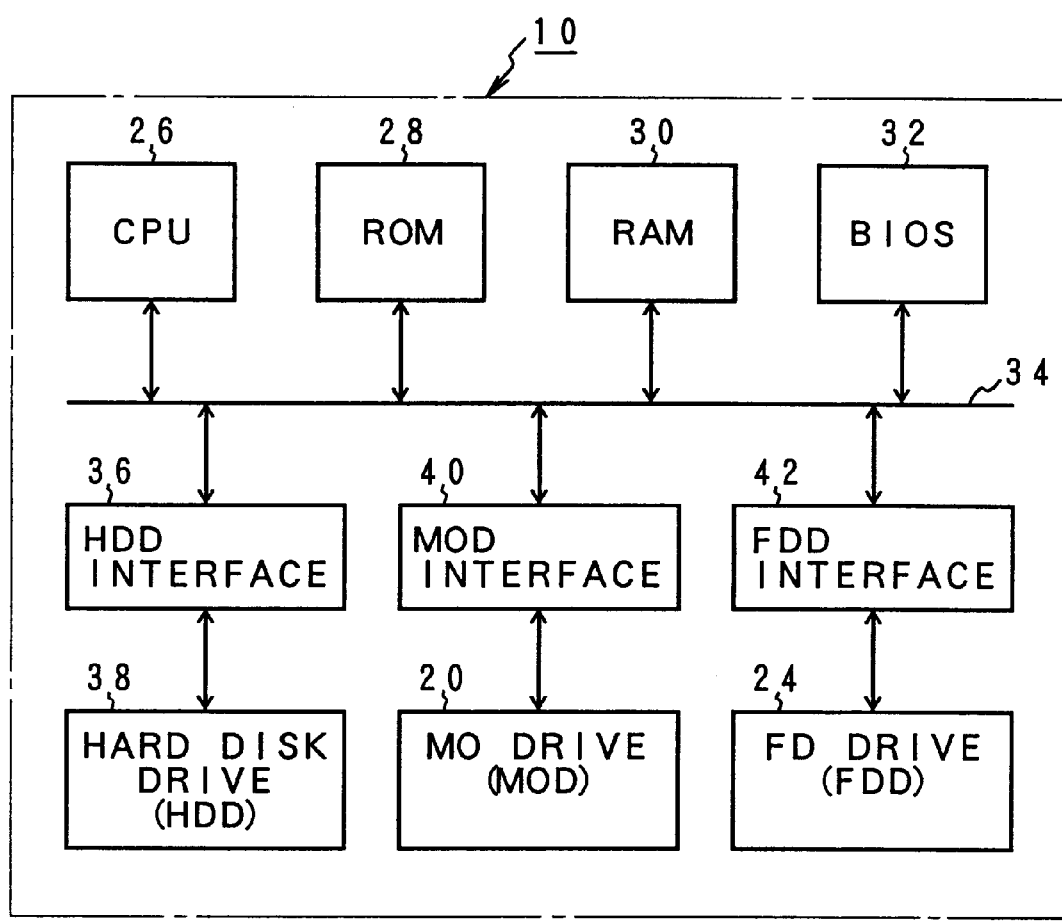
FIG. 2 is a block diagram of a hardware construction of FIG. 1.

FIG. 2 is a block diagram of a hardware construction of the personal computer 10 in FIG. 1. A CPU 26 is provided for the personal computer 10. An ROM 28 in which programs have been stored, an RAM 30 which operates as a main storage, and a BIOS 32 known as a basic input output system are connected to a bus 34 of the CPU 26. A hard disk drive 38 is connected to the bus 34 through an HDD interface 36. The MO drive 20 is connected to the bus 34 through an MOD interface 40. Further, the FD drive 24 is connected through an FDD interface 42. In the personal computer 10, the built-in MO drive 20 and FD drive 24 are recording and reproducing apparatuses using removable media. The embodiment, however, will be described with respect to an example of using the MO drive 20 as a removable apparatus as a target of the invention.

Figure 3B:
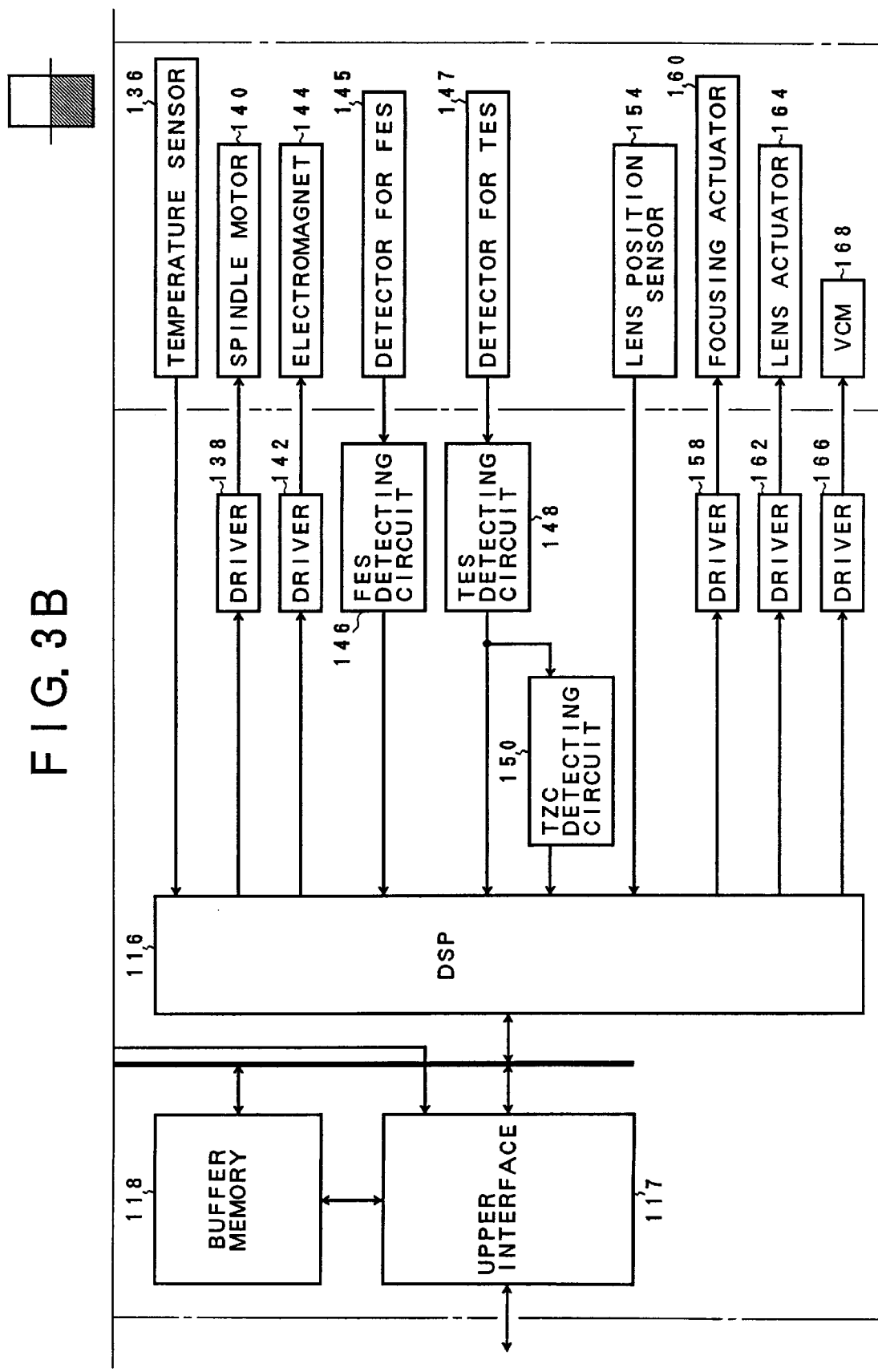

FIG. 3 is a block diagram of the MO drive 20 built in the personal computer 10 in FIG. 2. The MO drive of the invention is constructed by a control unit 110 and an enclosure 111. The control unit 110 has: an MPU 112 for performing a whole control of an optical disk drive; an interface 117 for transmitting and receiving commands and data to/from an upper apparatus; an optical disk controller (ODC) 114 for performing processes necessary to read and write data from/to an optical disk medium; a DSP 116; and a buffer memory 118. The buffer memory 118 is commonly used by the MPU 112, optical disk controller 114, and upper interface 117. The optical disk controller 114 has a formatter 114-1 and an ECC processing unit 114-2. At the time of a write access, the formatter 114-1 divides NRZ write data on a sector unit basis of the medium and forms a recording format. The ECC processing unit 114-2 forms an ECC code on a sector write data unit basis and adds it and, if necessary, forms a CRC code and adds it. Further, the sector data after completion of the ECC encoding is converted to, for example, a 1-7RLL code. At the time of a read access, the sector read data is 1-7RLL inversely converted and a CRC check is performed in the ECC processing unit 114-2. After that, the data is error detection corrected. Further, the NRZ data of the sector unit is coupled to the error detected and corrected data by the formatter 114-1 and the resultant data is transferred as a stream of the NRZ read data to the upper apparatus. A write LSI circuit 120 is provided for the optical disk controller 114. A write modulating unit 121 and a laser diode control circuit 122 are provided for the write LSI circuit 120. A control output of the laser diode control circuit 122 is supplied to a laser diode unit 130 provided for an optical unit on the enclosure 111 side. The laser diode unit 130 integratedly has a laser diode 130-1 and a detector 130-2 for monitoring. The write modulating unit 121 converts write data into a data format in the PPM recording or PWM recording (also referred to as a mark recording or an edge recording). As an optical disk for recording and reproduction by using the laser diode unit 130, namely, as a rewritable MO cartridge medium, in the embodiment, any one of the media of 128 MB, 230 MB, 540 MB, and 640 MB can be used. Among them, as for the MO cartridge medium of 128 MB, the pit position recording (PPM recording) for recording data in correspondence to the presence or absence of a mark on the medium is used. A recording format of the medium is set to a zone CAV and the number of zones of a user area is equal to one zone in case of the 128 MB medium. With respect to the MO cartridge media of 230 MB, 540 MB, and 640 MB in which the high density recording is performed, the pulse width recording (PWM recording) in which edges of a mark, namely, a leading edge and a trailing edge are made correspond to data is used. A difference between the storage capacities of 640 MB medium and 540 MB medium is based on a difference of the sector capacities. When the sector capacity is equal to 2048 bytes, the storage capacity is equal to 640 MB. When the sector capacity is equal to 512 bytes, the storage capacity is equal to 540 MB. The recording format of the medium is the zone CAV. The number of zones of the user area is equal to 10 zones in case of the 230 MB medium, 11 zones in case of the 640 MB medium, and 18 zones in case of 540 MB medium. As mentioned above, the optical disk drive of the invention can cope with the MO cartridges of the storage capacities of 128 MB, 230 MB, 540 MB, and 640 MB and, further, the MO cartridges of the storage capacities of 540 MB and 640 MB corresponding to the direct overwrite system. When the MO cartridge is loaded into the optical disk drive, therefore, an ID portion of the medium is first read out, the kind of medium is recognized by the MPU 112 from its pit interval, and a kind result is notified to the optical disk controller 114. A read LSI circuit 124 is provided as a reading system for the optical disk controller 114. A read demodulating unit 125 and a frequency synthesizer 126 are built in the read LSI circuit 124. A photosensitive signal of the return light of a beam from the laser diode 130-1 by a detector 132 for ID/MO provided for the enclosure 111 is inputted as an ID signal and an MO signal to the read LSI circuit 124 through a head amplifier 134. Circuit functions of an AGC circuit, a filter, a sector mark detecting circuit, and the like are provided for the read demodulating unit 125 of the read LSI circuit 124. A read clock and read data are formed from the inputted ID signal and MO signal and the PPM data or PWM data is demodulated to the original NRZ data. Since the zone CAV is used, a frequency dividing ratio for generating a clock frequency corresponding to the zone is set and controlled into the frequency synthesizer 126 built in the read LSI circuit 124 from the MPU 112. The frequency synthesizer 126 is a PLL circuit having a programmable frequency divider and generates a reference clock having a predetermined peculiar frequency as a read clock in accordance with the zone position of the medium. That is, the programmable frequency divider 126 is constructed by the PLL circuit having the programmable frequency divider. In accordance with the following equation, the MPU 112 generates a reference clock of a frequency f0 according to a frequency dividing ratio (m/n) which was set in accordance with the zone number.

$$f0=(m/n)\cdot fi$$

Where, a frequency division value n of a denominator of the frequency dividing ratio (m/n) is a peculiar value according to the kind of medium of 128 MB, 230 MB, 540 MB, or 640 MB. A frequency division value m of the numerator is a value which changes according to the zone position of the medium and has been prepared as table information of values corresponding to the zone numbers for each medium. The read data demodulated by the read LSI circuit 124 is sent to the reading system of the optical disk controller 114 and is subjected to an inverse conversion of 1-7RLL. After that, the data is subjected to a CRC check and an ECC process by an encoding function of the ECC processing unit 114-2, so that the NRZ sector data is reconstructed. Subsequently, the NRZ sector data is converted by the formatter 114-1 into an NRZ read data stream in which the NRZ sector data is coupled. This stream is transferred to the upper apparatus by the upper interface 117 via the buffer memory 118.

A detection signal of a temperature sensor 136 provided on the enclosure 111 side is inputted to the MPU 112 via the DSP 116. On the basis of an environmental temperature in the apparatus detected by the temperature sensor 136, the MPU 112 controls each of the light emitting powers for reading, writing, and erasing in the laser diode control circuit 122 to an optimum value. The MPU 112 controls a spindle motor 140 provided on the enclosure 111 side by a driver 138 via the DSP 116. Since the recording format of the MO cartridge is the zone CAV, the spindle motor 140 is rotated at a constant velocity of, for example, 3000 rpm. The MPU 112 controls an electromagnet 144 provided on the enclosure 111 side through a driver 142 via the DSP 116. The electromagnet 144 is arranged on the opposite side of the beam irradiating side of the MO cartridge loaded in the apparatus and supplies an external magnetic field to the medium upon recording and erasing. The DSP 116 has a servo function for positioning the beam from the laser diode 130 for the medium and functions as a seek control unit and an on-track control unit for seeking to a target track, thereby accomplishing an on-track. The seek control and on-track control can be simultaneously executed in parallel with the write access or read access for an upper command by the MPU 112. To realize the servo function of the DSP 116, a detector 145 for FES to receive the beam return light from the medium is provided for the optical unit on the enclosure 111 side. An FES detecting circuit (focusing error signal detecting circuit) 146 forms a focusing error signal El from the photosensing output of the FES detector 145 and supplies to the DSP 116. A detector 147 for TES to receive the beam return light from the medium is provided for the optical unit on the enclosure 111 side. A TES detecting circuit (tracking error signal detecting circuit) 148 forms a tracking error signal E2 from the photosensing output of the TES detector 147 and supplies to the DSP 116. The tracking error signal E2 is inputted to a TZC detecting circuit (track zero-cross detecting circuit) 150, by which a track zero-cross pulse E3 is formed and inputted to the DSP 116. A lens position sensor 154 for detecting a lens position of an objective lens to irradiate the laser beam onto the medium is provided on the enclosure 111 side. A lens position detection signal (LPOS) E4 from the lens position sensor 154 is inputted to the DSP 116. Further, to control the position of a beam spot on the medium, the DSP 116 controls and drives a focusing actuator 160, a lens actuator 164, and a VCM 168 through drivers 158, 162, and 166.

Figure 4:
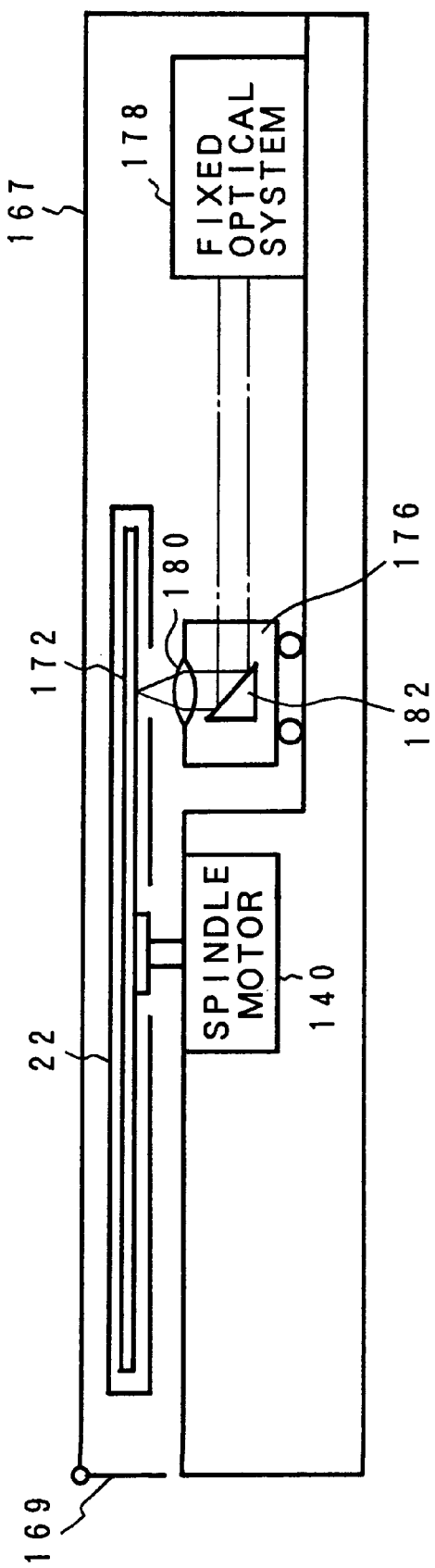
FIG. 4 is an explanatory diagram of an internal structure of the apparatus in FIGS. 3A and 3B.

An outline of the enclosure 111 in the optical disk drive is as shown in FIG. 4. The spindle motor 140 is provided in a housing 167. A loading operation such that by inserting the MO cartridge 22 from an inlet door 169 side to a hub of a rotary shaft of the spindle motor 140, an internal MO medium 172 is attached to the hub of the rotary shaft of the spindle motor 140 is executed. A carriage 176 which is movable in the direction which transverses the tracks on the medium by the VCM 168 is provided under the MO medium 172 of the loaded MO cartridge 22. An objective lens 180 is mounted on the carriage 176. The beam from the laser diode provided for a fixed optical system 178 is reflected by a leading mirror 182 and is inputted to the objective lens 180, thereby forming a beam spot onto the medium surface of the MO medium 172. The objective lens 180 is moved in the optical axial direction by the focusing actuator 160 shown in the enclosure 111 in FIGS. 3A and 3B and can be moved in the radial direction which traverses the tracks on the medium within a range of, for example, tens of tracks by the lens actuator 164. The position of the objective lens 180 mounted on the carriage 176 is detected by the lens position sensor 154 in FIGS. 3A and 3B. The lens position sensor 154 sets the lens position detection signal to zero at the neutral position where the optical axis of the objective lens 180 is directed right overhead and generates the lens position detection signals E4 having different polarities according to the movement amounts with respect to the movement to the outer side and the movement to the inner side, respectively.

Figure 5:
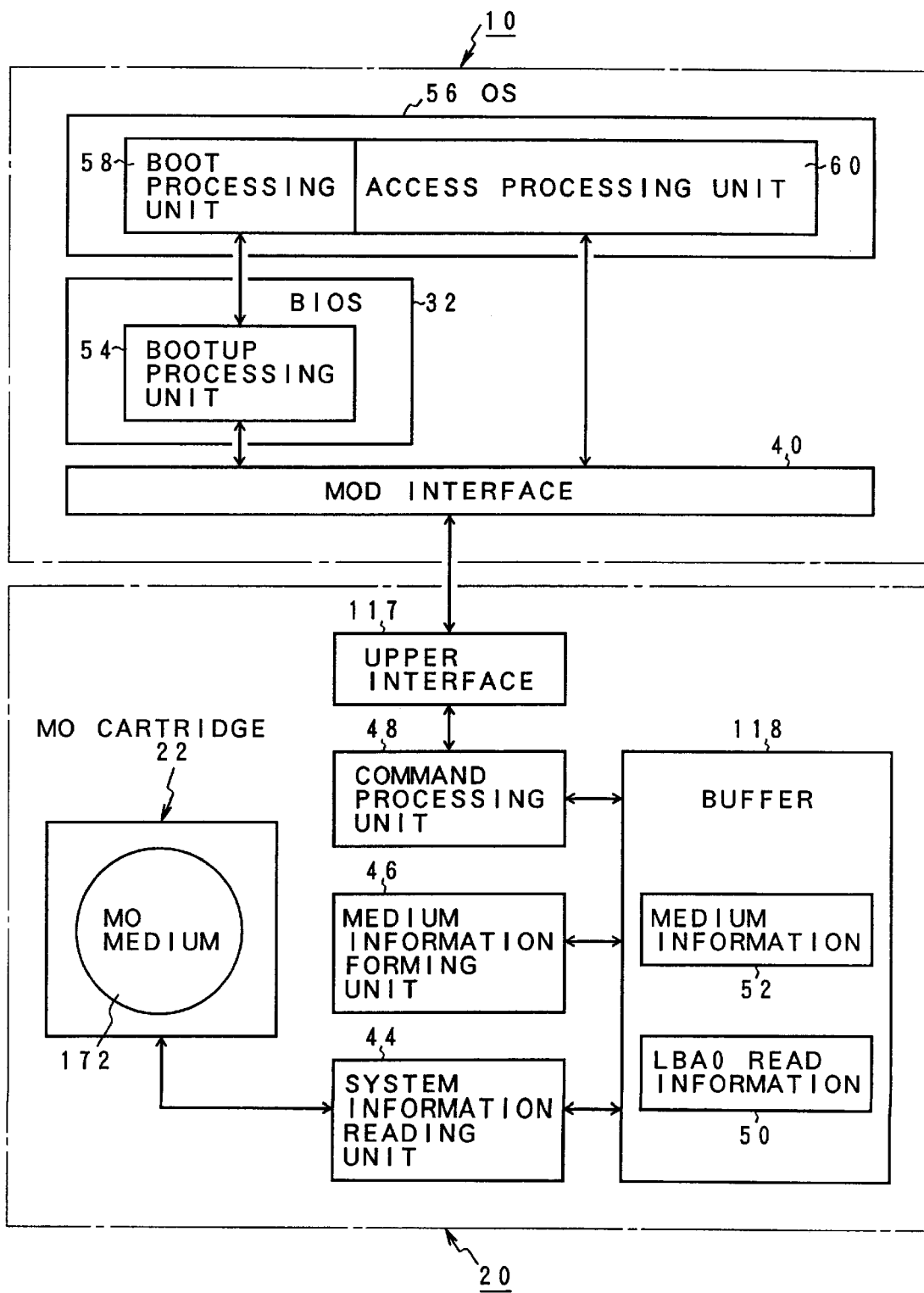
FIG. 5 is a functional block diagram of the drive built-in type in FIG. 1.

FIG. 5 is a functional block diagram of a processing apparatus of a removable medium according to the invention for the MO drive 20 and CPU 26 in FIG. 2 as targets. First, the MO medium 172 built in the MO cartridge 22 is inserted in the MO drive 20. When an apparatus power source provided for the personal computer 10 is turned on, a power source is also supplied to the MO drive 20 built in the personal computer main body 12 as shown in FIG. 1. By the program control of the MPU 112 of the control unit 110 shown in FIGS. 3A and 3B, the functions of a system information reading unit 44, a medium information forming unit 46, and a command processing unit 48 are realized. When the apparatus power source of the personal computer 10 is turned on, the system information reading unit 44 reads out system information of the MO medium 172 inserted in the MO drive 20 by the MO cartridge 22 and caches into the buffer 118. Now considering a PC/AT corresponding medium format as an MO cartridge 22 as an example, the system information reading unit 44 reads out a head logic block address (hereinafter, referred to as "LBA0") of the MO medium 172 and caches into the buffer 118 as LBA0 read information 50. The medium information forming unit 46 analyzes the LBA0 read information 50 cached in the buffer 118 and forms medium information 52 that is necessary for a bootup process of the MO drive 20 on the personal computer 10 side. At least the format kind of the MO medium 172 is included in the medium information 52. The command processing unit 48 decodes a request command of the medium information sent from the upper side when the apparatus power source of the personal computer 10 is turned on, reads out the medium information 52 formed in the buffer 118, and transfers it. On the other hand, the personal computer 10 serving as an upper apparatus has: a bootup processing unit 54 which is executed when the apparatus power source is turned on in the BIOS 32; a boot processing unit 58 which is realized as a processing function of an operating system (hereinafter, abbreviated as "OS") 56; and an access processing unit 60 which functions as a driver for the MO drive 20. When the power source of the apparatus main body is turned on, the bootup processing unit 54 of the BIOS 32 is activated, a request command of medium information is issued to the MO drive 20 through the MOD interface 40, and the medium information 52 formed on the MO drive 20 side is obtained. As a medium information request command which is issued by the bootup processing unit 52 of the BIOS 32, an identify command is issued in the case where the ATA interface is supported as an MOD interface 40. In the case where the ATAPI interface is supported as an MOD interface 40, an inquiry command is issued. With respect to the other interfaces, a proper command defined by each interface can be also used. When the medium information 52 is obtained from the MO drive 20, the bootup processing unit 54 of the BIOS 32 executes the bootup process corresponding to the format kind included in the obtained medium information 52, loads a boot program recorded in the MO medium 172 into a main storage of the personal computer 10, transfers the process to the boot processing unit 58 of the OS 56, executes the boot process, and establishes an accessible state of the MO drive 20 by the access processing unit 60 due to the completion of the boot process.

Figure 6:
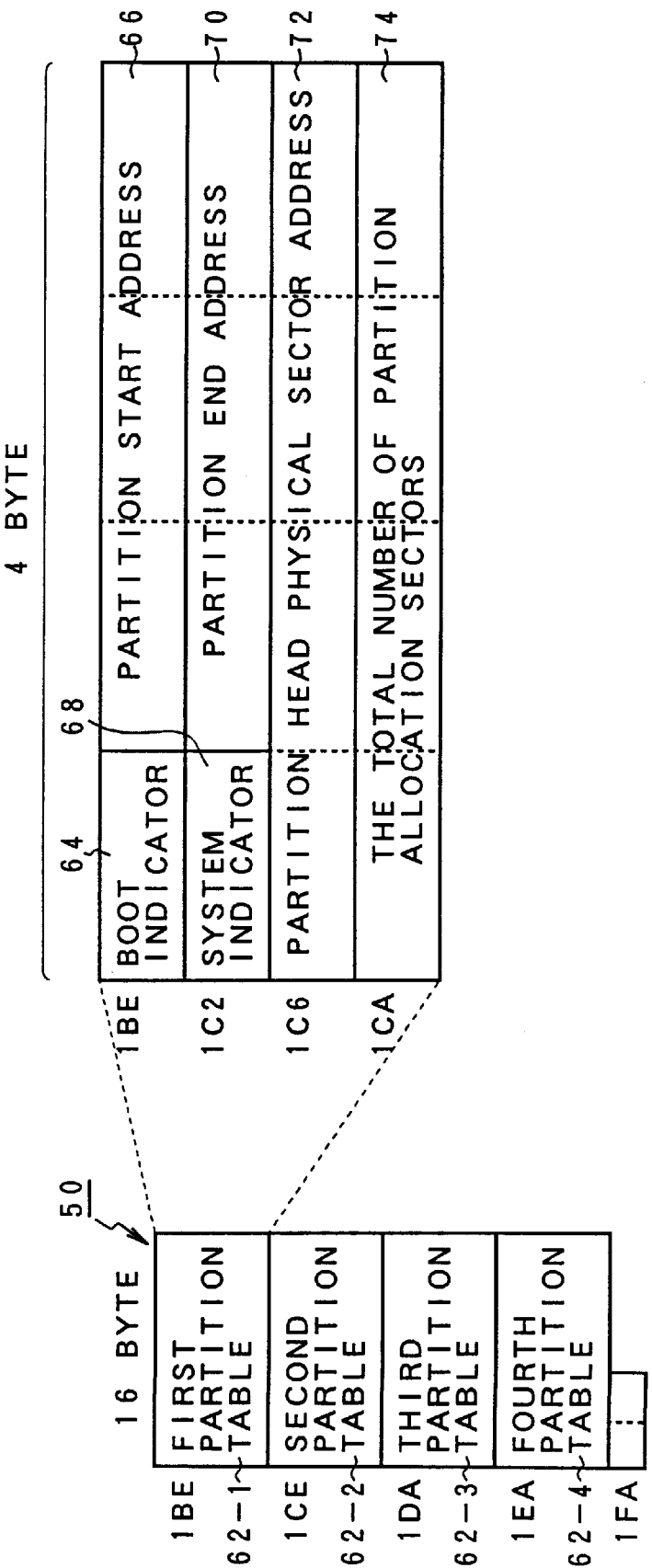
FIG. 6 is an explanatory diagram of a logic block address LBA0 out by a drive side in FIG. 5.

FIG. 6 shows the LBA0 read information 50 of the MO medium 172 cached in the buffer 118 by the system information reading unit 44 provided for the MO drive 20 in FIG. 5. In the PC/AT corresponding medium, the LBA0 read information 50 has the following four partition tables on a 64-byte unit basis from a byte address 1BE of the hexadecimal notation: namely, a first partition table 62-1; a second partition table 62-2; a third partition table 62-3, and a fourth partition table 62-4. The LBA0 read information 50 is the information of total 184 bytes in which two bytes of a byte address 1FA are added. As for the first to fourth partition tables 62-1 to 62-4, as typically shown on the right side, the first partition table 62-1 is constructed by a boot indicator 64, a partition start address 66, a system indicator 68, a partition end address 70, a partition head physical sector address 72, and the total number of partition allocation sectors 74. The boot indicator 64 shows whether a boot program to boot the MO drive has been stored in the first partition designated by the partition start address 66 and partition end address 70 in the first partition table 62-1 or not.

As shown in FIG. 7, the boot indicator 64 shows that a hexadecimal code "00h" of the boot indicator indicates a non-bootable partition and that a hexadecimal code "20h" indicates a bootable partition. For example, when one partition is allocated by a certain logic format, this partition certainly becomes a bootable partition. The BIOS 32 reads out the bootable program of the partition to the main storage by the bootup processing unit and allows the bootup processing unit to execute the bootup process of the OS, so that the apparatus can be set into the accessible state. On the other hand, in the case where a plurality of partitions are allocated to a certain logic format, the partition which is located at the head and serves as a master is a bootable partition and the other remaining partitions become the non-bootable partitions because the boot process is unnecessary.

A command number showing a format of the partition has been stored in the system indicator 68 in FIG. 6. FIG. 8 shows a specific example of a PC/AT corresponding format table 76 and a format name 80 has been defined in correspondence to a command number 78 using a hexadecimal code. Specifically speaking, a hexadecimal command number "00h" indicates an un-used format name. For example, by the command number "00h", it is possible to recognize that the partition is an unformatted partition or a partition whose format is obscure. A next hexadecimal command number "01h" indicates a format name of "DOS 12-bit FAT". As the other command numbers belonging to the format name FAT, there are "DOS 16-bit<32M" of a hexadecimal command number "04h" and "DOS 16-bit≧32M" of a command number "06h". Although the format table 76 of FIG. 8 relates to the PC/AT corresponding OS as an example, with respect to the other OSs as well, it is sufficient to form a format table in which command numbers and format names are made correspond with respect to the format which is supported by the OS.

Figure 9:
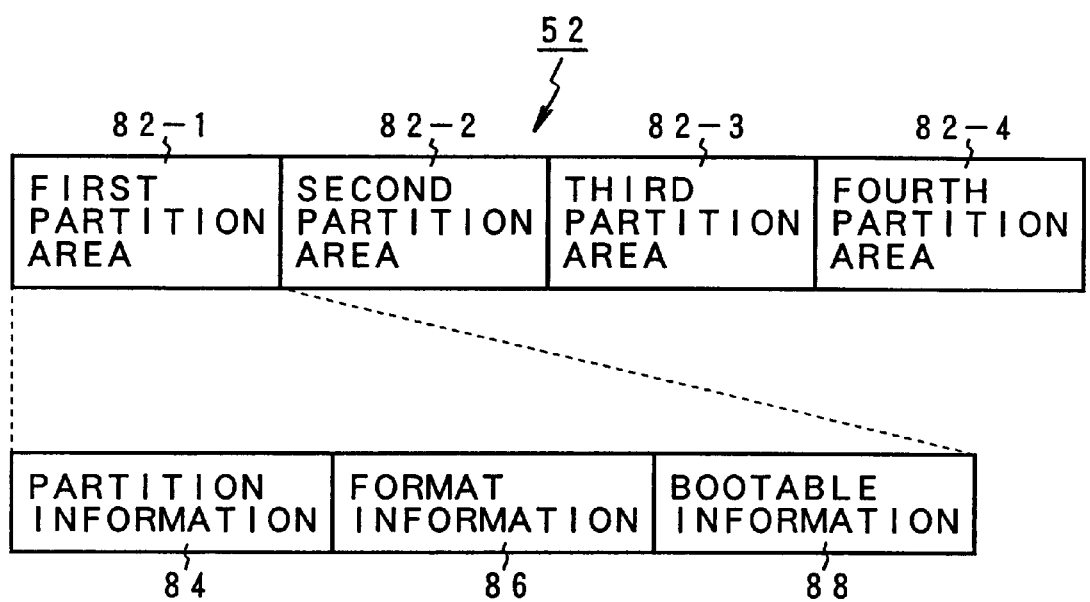
FIG. 9 is an explanatory diagram of medium information which is formed on the drive side in FIG. 5.

FIG. 9 shows the medium information 52 which is formed by the analysis of the PC/AT corresponding LBA0 read information 50 in FIG. 6 by the medium information forming unit 46 provided for the MO drive 20 in FIG. 5. In correspondence to the first to fourth partition tables 62-1 to 62-4 in FIG. 6, the medium information 52 has the following four partition areas: namely, a first partition area 82-1; a second partition area 82-2; a third partition area 82-3; and a fourth partition area 82-4. As for the first to fourth partition areas 82-1 to 82-4, as typically shown in the diagram, the first partition area 82-1 is constructed by partition information 84, format information 86, and bootable information 88. As a method of forming the partition information 84, with regard to the LBA0 read information 50 in FIG. 6, the table contents are sequentially searched in accordance with the order of the first partition table 62-1 to the fourth partition table 62-4, thereby discriminating whether the medium type is an HDD type having the partitions or super floppy disk type (SFD type) having no partition. With respect to the HDD type having the partitions, the number of partitions is discriminated. Further, to verify whether the determined number of partitions is correct or not, with reference to the partition start address 66 and partition end address 70 in each partition table, it is discriminated from the actual medium address, thereby confirming that the table value is correct. As another method of discriminating the presence or absence of the partitions, they can be also discriminated at the 36th byte of the LBA0 read information 50. When a hexadecimal code of the 36th byte of the LBA0 read information 50 is equal to "00h", it shows the super floppy disk type (SFD type) having no partition. When the hexadecimal code is equal to "80h", it shows the HDD type having the partitions. Obviously, the presence or absence of the partitions and the number of partitions in the case where there are the partitions can be also recognized by another proper method by the analysis of the LBA0 read information 50. As partition information, the partition start address 66, partition end address 70, partition head physical sector address 72, and the total number of partition allocation sectors 74 shown in FIG. 6 can be also included as partition detailed information into the medium information as necessary. Each of the partition start address 66 and partition end address 70 is constructed by a head address of eight bits, a cylinder address of upper two bits, a sector address of six bits, and a cylinder address of lower six bits from the head. As for the partition start address 66 and partition end address 70, in case of the removable medium, since there is only one head address, the partition start address 66 and partition end address 70 are not particularly necessary. For example, head eight bits (one byte) of the partition end address 70 are used as an expansion area of the system indicator 68 and the system indicator 68 is set to two bytes, so that the command number of two bytes of the format table in FIG. 8 can be stored.

In case of the PC/AT corresponding OS, the format information 86 next to the partition information 84 in FIG. 9 is provided with the hexadecimal command number corresponding to the format table 76 in FIG. 8. Further, as for the bootable information 88, the hexadecimal code of the boot indicator 64 shown in FIG. 7 is used as it is. That is, it is sufficient to provide a hexadecimal code "20h" in case of the bootable partition and to provide a hexadecimal code "00h" in case of the non-bootable partition.

Figure 10:
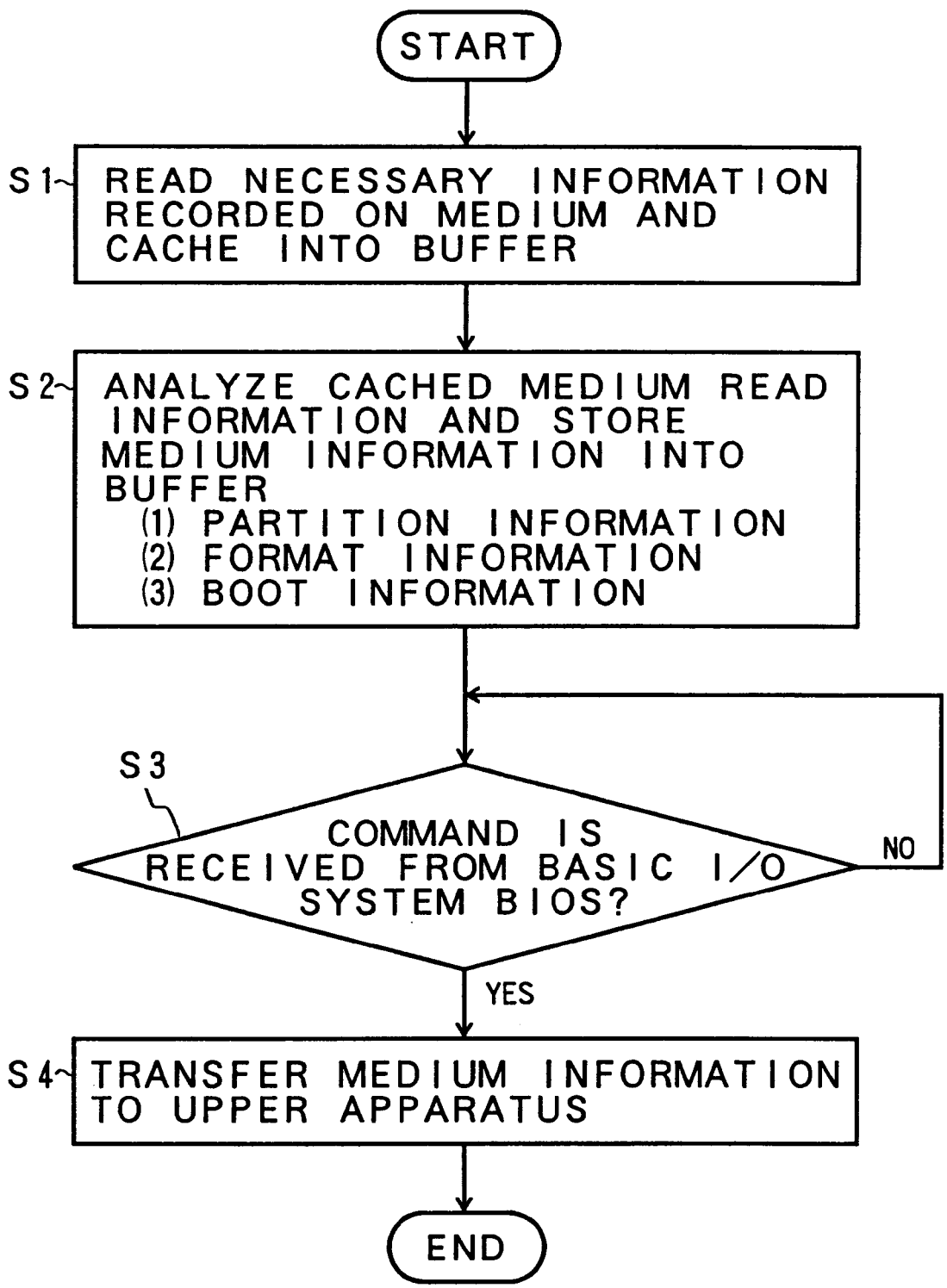
FIG. 10 is a flowchart for the processing operation of the MO drive in FIG. 5.

FIG. 10 is a flowchart for the processing operation when the apparatus power source of the MO drive 20 in the functional block of FIG. 5 is turned on. When the apparatus power source of the personal computer 10, namely, a power switch provided for the personal computer main body 12 is operated and the apparatus power source is turned on, the MO drive 20 in FIG. 5 reads out information necessary to form the medium information 52 recorded on the MO medium 172 in the MO cartridge 22 inserted in the drive by the system information reading unit 44. That is, in the PC/AT corresponding OS, the LBA0 read information 50 in FIG. 6 is read out and cached into the buffer 118. Subsequently in step S2, the LBA0 read information 50 cached in the buffer 118 is analyzed and partition information including the partition information 84, format information 86, and bootable information 88 as shown in FIG. 9 is formed every partition. In step S3, a check is made to see if a request command of the medium information in association with the execution of the bootup process of the bootup processing unit 54 of the BIOS 32 mounted on the mother board of the personal computer 10 activated by the apparatus power source has been received. When this command is received, the formed medium information 52 is transferred to the BIOS 32 on the upper apparatus side in step S4.

Figure 11:
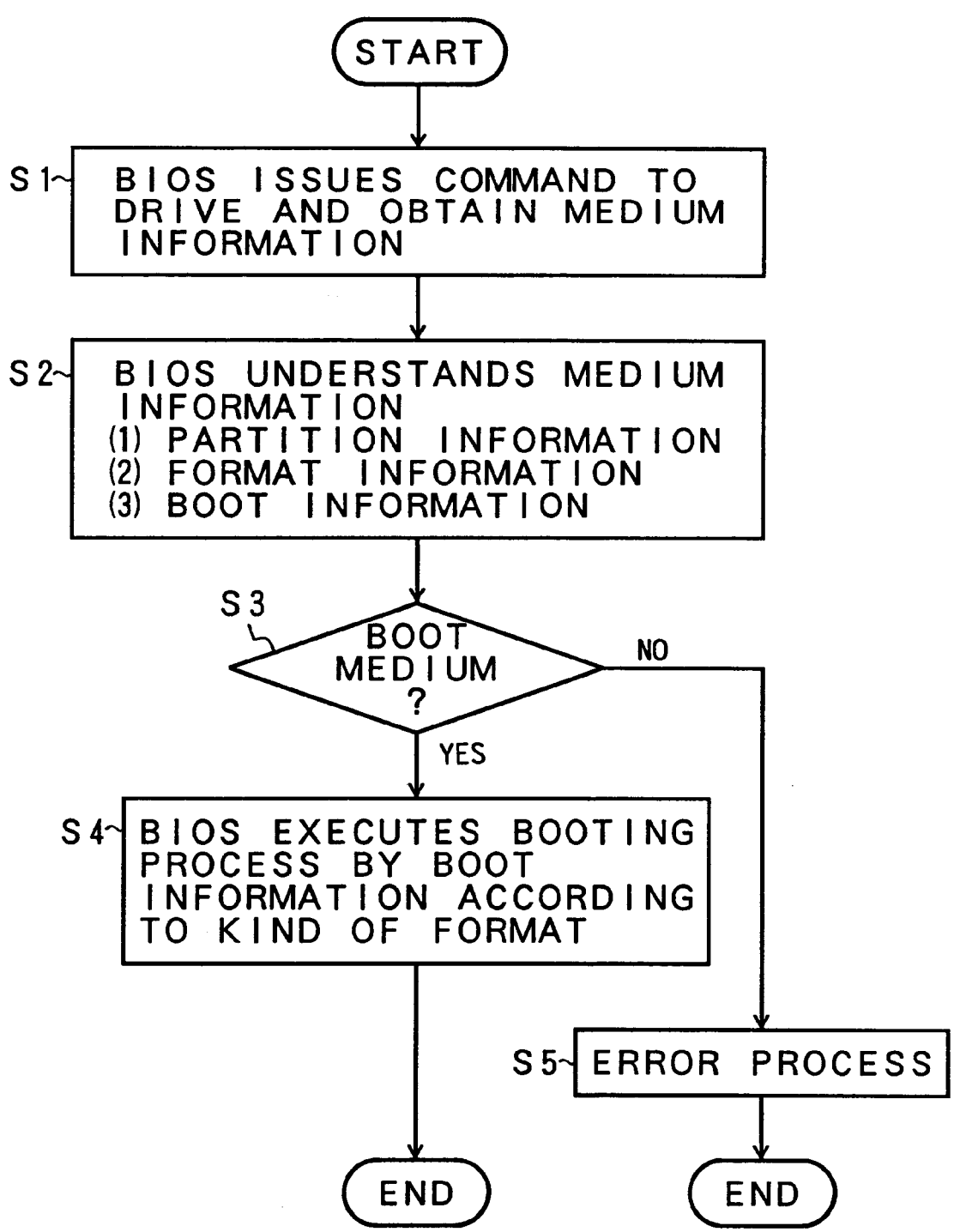
FIG. 11 is a flowchart for the processing operation of an upper BIOS in FIG. 5.

FIG. 11 is a flowchart for the processing operation of the BIOS in the upper apparatus when the apparatus power source in FIG. 5 is turned on. When the apparatus power source is turned on, first in step S1, the BIOS 32 activates the bootup processing unit 54, issues the request command of the medium information to the MO drive 20, and obtains the medium information. In step S2, the BIOS 32 understands the obtained medium information. That is, the BIOS 32 recognizes the partition information, format information, and boot information included in the medium information. In step S3, from the boot information included in the medium information, a check is made to see if the head partition in which a bootup program (master partition) has been stored is a bootable partition. If it is the bootable partition, step S4 follows. The bootup program which serves as a head portion of the boot program corresponding to the format derived from the format information and has previously been fixedly recorded in the BIOS 32 is executed. By the execution of the bootup process, the boot program stored in the active partition of the MO medium 172 is read out and loaded into the main storage. The processes are transferred from the bootup processing unit 54 to the boot processing unit 58 of the OS 56 and the boot process is executed. On the other hand, in step S3, when it is determined from the medium information that the head partition is the non-bootable partition, the bootup cannot be performed, so that an error process is performed in step S5.

(Drive Plug-in Type)

Figure 12:
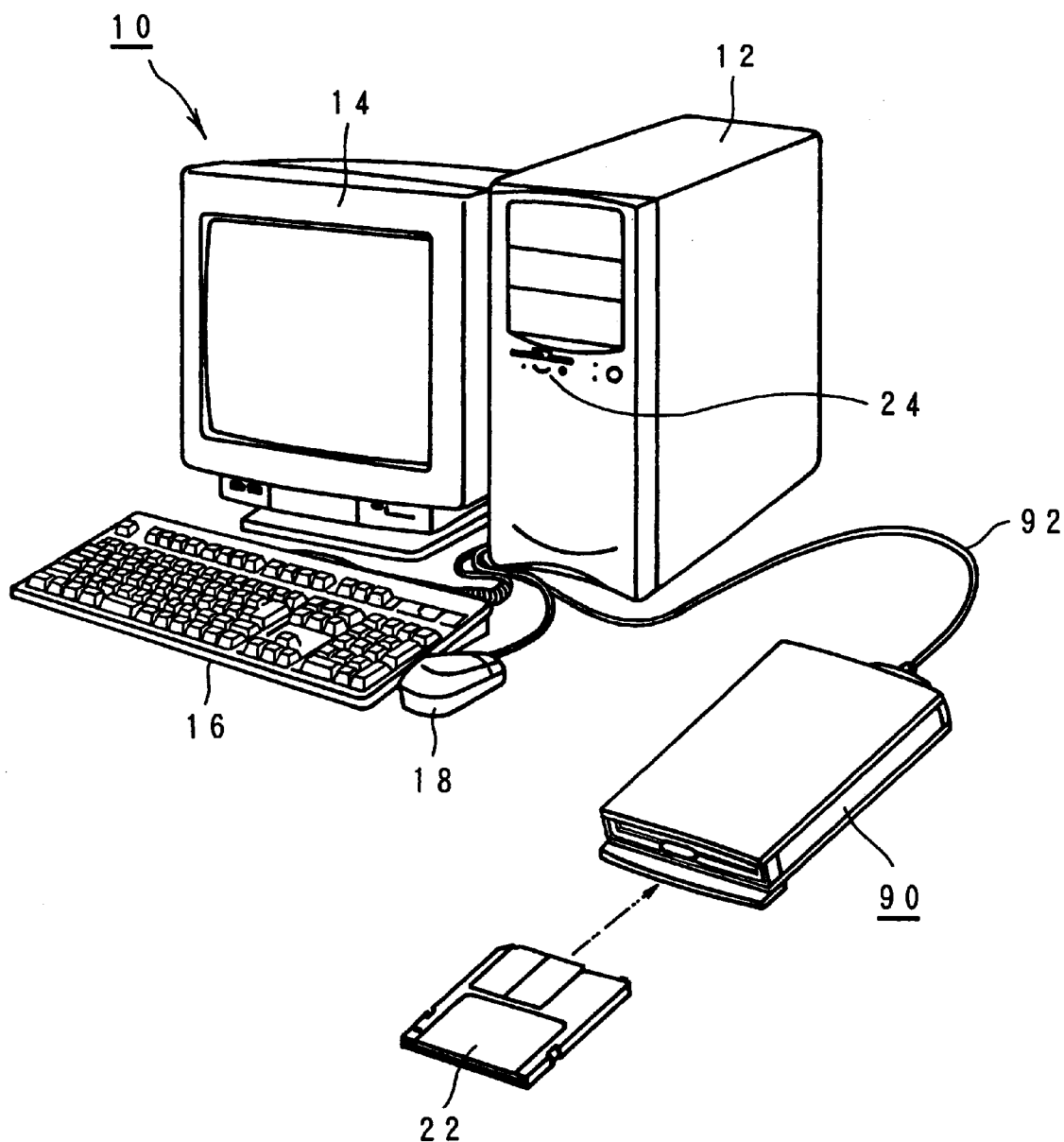
FIG. 12 is an explanatory diagram of an apparatus construction in which a plug-in type drive is used.

FIG. 12 is another embodiment of a personal computer to which a processing apparatus of a removable medium according to the invention is applied. The embodiment is characterized in that an MO drive 90 as a removable medium processing apparatus is constructed as a plug-in type such that it is externally connected to the personal computer by a connector cable and is used. That is, the personal computer is constructed by the personal computer main body 12, display 14, keyboard 16, and mouse 18. The MO drive 90 as a target of the invention is of the plug-in type such that the MO drive 90 is externally connected to the personal computer main body 12 by a connector cable 92. In the plug-in type MO drive 90, when the MO drive 90 is used in an operating state in which the apparatus power source of the personal computer 10 has been turned on, a power source of the MO drive 90 is turned on by an ON operation of a power switch provided for the MO drive 90 and, after that, the MO cartridge 22 is inserted, thereby allowing an access by the personal computer 10 to be executed. In case of the plug-in type MO drive 90, therefore, the boot process at the time of turn-on of the apparatus power source like a personal computer main body built-in type in FIG. 1 is unnecessary. When the power source of the MO drive 90 is turned on and the MO cartridge 22 is inserted, an accessible state of the MO drive 90 is established by the OS on the personal computer 10 side.

Figure 13:
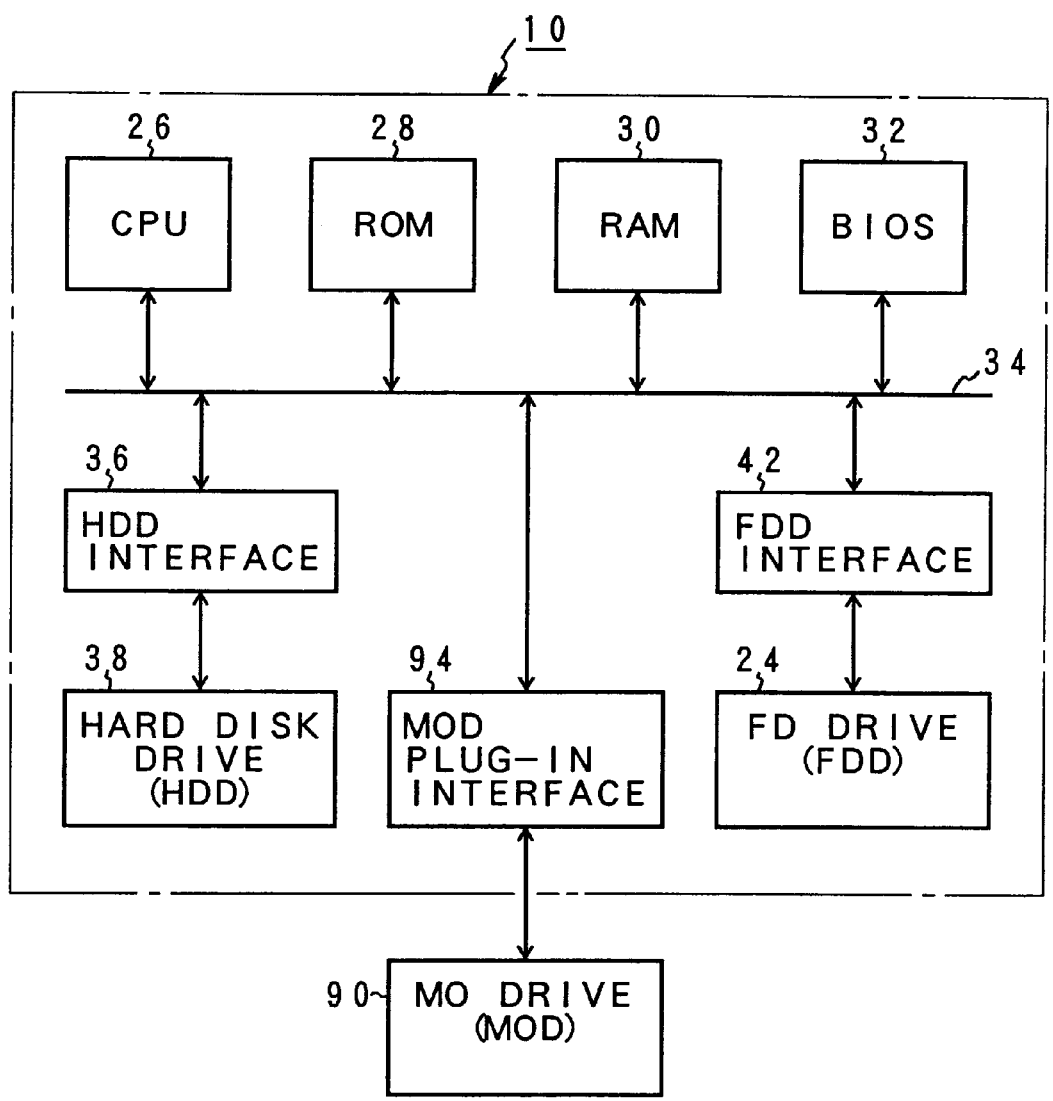
FIG. 13 is a block diagram of a hardware construction in FIG. 12.

FIG. 13 is a block diagram of hardware of the personal computer 10 in FIG. 12 and the MO drive 90 externally connected by the plug-in manner. In a manner similar to the drive built-in type of FIG. 2, the personal computer 10 comprises: the CPU 26; ROM 28; RAM 30; BIOS 32; bus 34; hard disk drive 38 connected through the HDD interface 36; and FD drive 24 connected through the FDD interface 42. In the embodiment, further, the MO drive 90 is externally connected to an MOD plug-in interface 94 by the connector cable. As an MOD plug-in interface 94, as means other than the ordinary interface cable, the MO drive can be also connected to a card slot of the personal computer 10 by a PC card.

Figure 14:
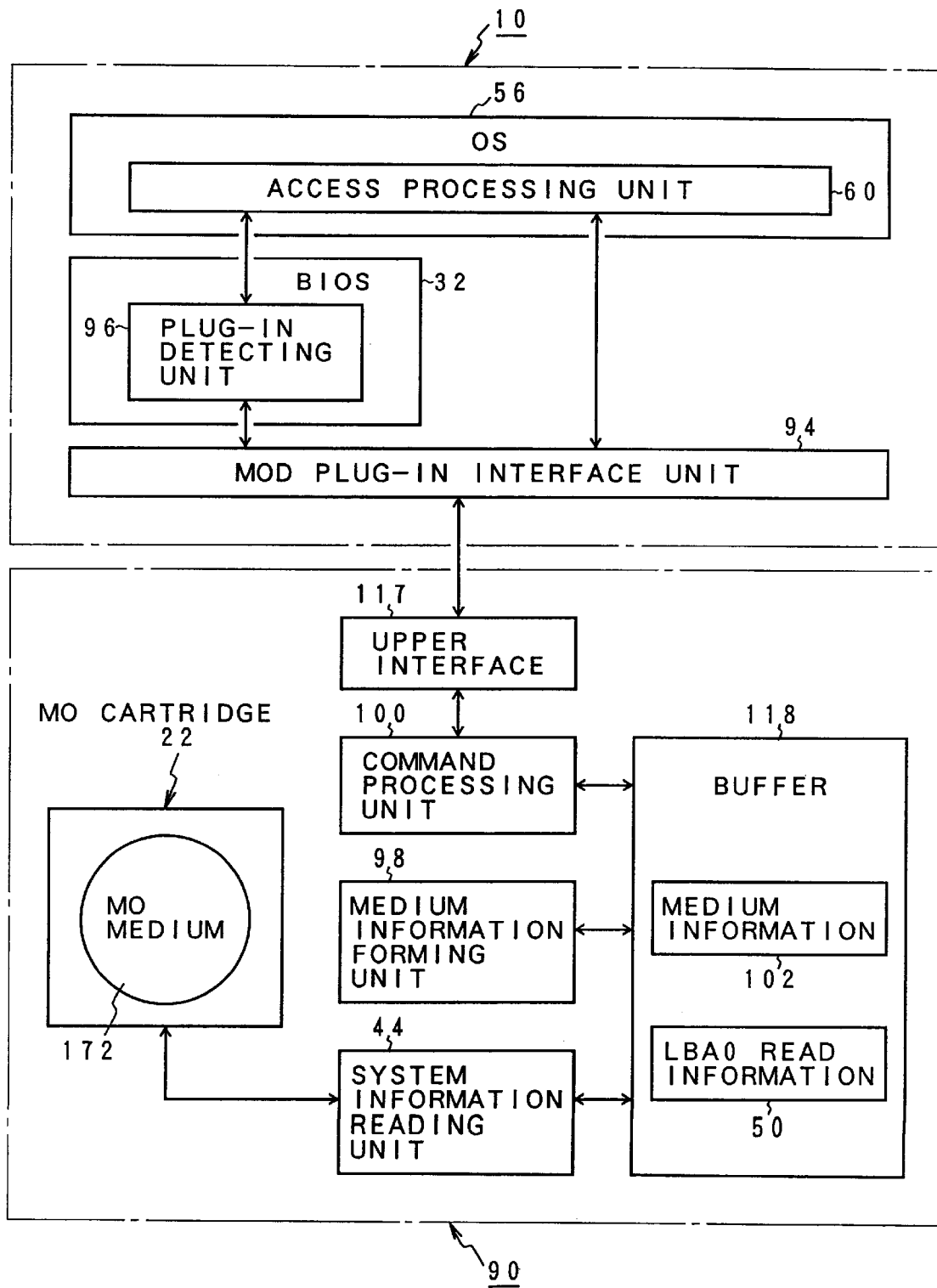
FIG. 14 is a functional block diagram of the construction in FIG. 12 in which the plug-in drive is used.
Figure 15:
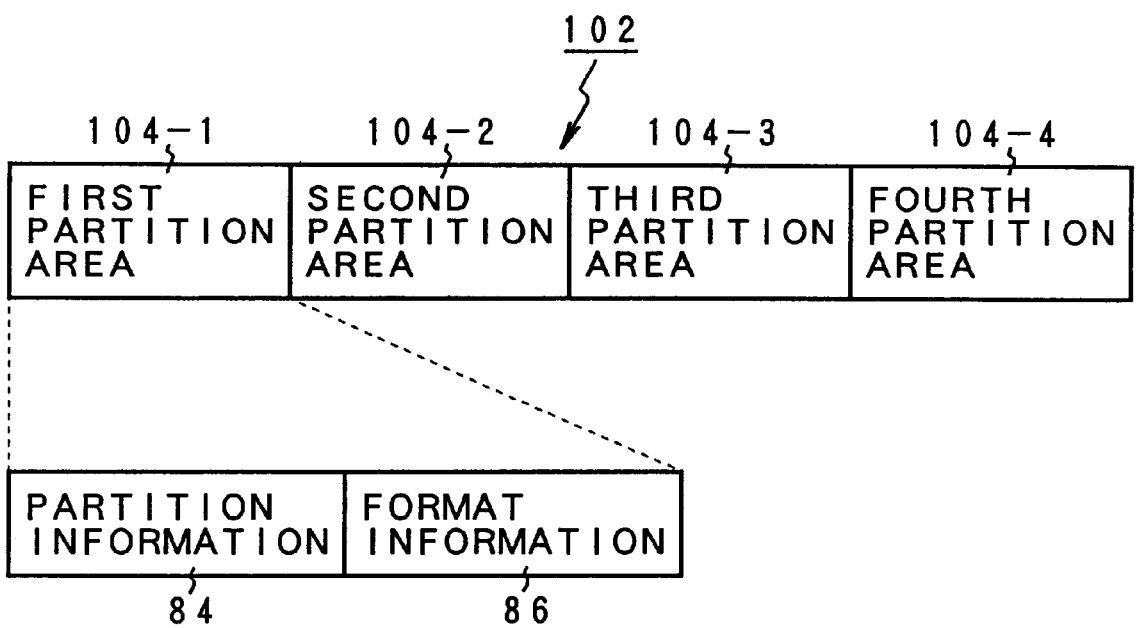
FIG. 15 is an explanatory diagram of system information which is formed on the drive side in FIG. 14.

FIG. 14 is a functional block diagram on the upper side and drive side of the invention for the plug-in type drive in FIG. 13 as a target. The MO drive 90 has the system information reading unit 44, a medium information forming unit 98, and a command processing unit 100. In the operating state where the apparatus power source on the personal computer 10 side has been turned on, when the power source of the MO drive 90 is turned on and the MO cartridge 22 is inserted, the system information reading unit 44 operates and reads out the system information from the MO medium 172. For example, in case of the PC/AT corresponding type, the LBA0 read information 50 is read out and cached into the buffer 118. The LBA0 read information is the same as that in FIG. 6. The medium information forming unit 98 analyzes the LBA0 read information 50 cached in the buffer 118 and forms medium information 102. As for the medium information 102 which is formed by the plug-in type MO drive 90, as shown in FIG. 15, partition information of a first partition area 104-1 to a fourth partition area 104-4 is formed on the basis of, for example, four partition tables. As typically shown in the diagram, the first partition area 104-1 is constructed by the partition information 84 and format information 86. The bootable information 88 formed in the drive built-in type in FIG. 11 is excluded. When the medium information request command from the personal computer 10 in association with the insertion of the MO cartridge 22 into the MO drive 90 is received, the command processing unit 100 reads out the medium information 102 formed in the buffer 118 and transfers. On the other hand, on the personal computer 10 side, since it has already been in the operating state by the turn-on of the apparatus power source, the access processing unit 60 of the OS 56 is in an accessible state for the external drive by the bootup process of the BIOS 32 at the time of turn-on of the apparatus power source, for example, by the boot process due to the loading of the boot program stored in the hard disk drive 38 in FIGS. 3A and 3B. Therefore, in case of the plug-in type MO drive 90, the bootup process by the BIOS 32 and the boot process by the OS 56 are unnecessary. In place of them, a plug-in detecting unit 96 is provided for the BIOS 32, thereby detecting the insertion of the MO cartridge 22 after the turn-on of the power source of the MO drive 90 which had externally been connected through the MOD plug-in interface 94. Connection information of the MO drive 90 is notified to the access processing unit 60 ad of the OS 56. When the connection notification of the MO drive 90 is received from the plug-in detecting unit 96 of the BIOS 32, the access processing unit 60 issues a medium information request command to obtain the medium information 102. The medium information request command which is issued by the access processing unit 60 of the OS 56 is an identify command in the case where the MO drive 90 supports the ATA interface. When the MO drive 90 supports the ATAPI interface, the medium information request command is an inquiry command. When the medium information 102 is obtained from the plug-in MO drive 90 due to the generation of the medium information request command, the access processing unit 60 discriminates the presence or absence of the partition from the partition information 84 in FIG. 15 included in the medium information 102. When there are the partitions, the number of partitions is also recognized. At the same time, the format in FIG. 8 is recognized from the command number of the format information 86. With respect to the partition to be set into the active state, the accessible state of the MO drive 90 by the recognized logic format is established.

Figure 16:
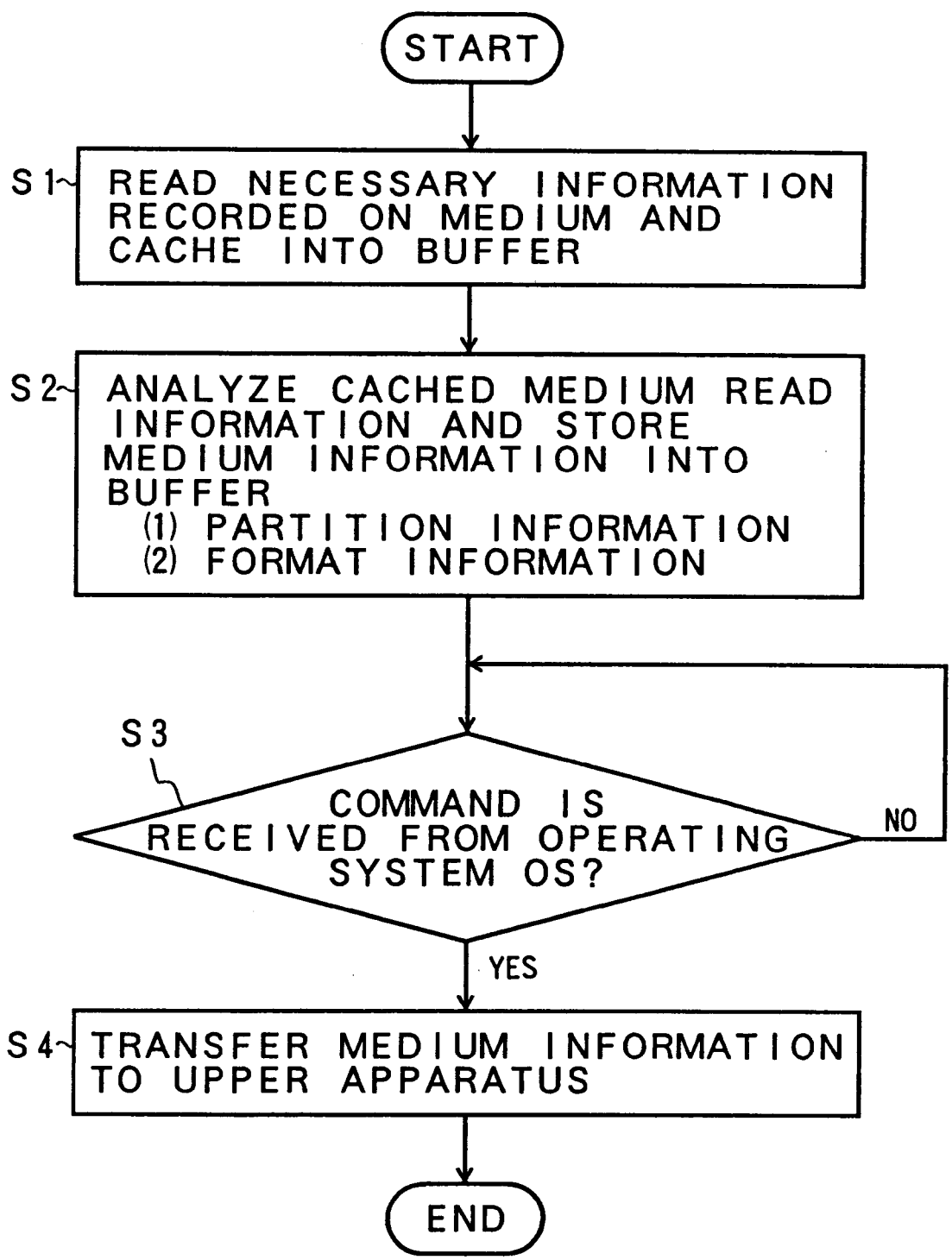
FIG. 16 is a flowchart for the processing operation of the MO drive in FIG. 14.

FIG. 16 is a flowchart for the processing operation when the power source of the plug-in type MO drive 90 in FIG. 14 is turned on and the medium is inserted. When the power source of the MO drive 90 is turned on and the MO cartridge 22 is inserted, the necessary system information recorded on the medium, specifically speaking, the LBA0 is read out and cached as LBA0 read information 50 into the buffer 118 in step S1. In step S2, the LBA0 read information 50 as system information cached in the buffer 118 is analyzed. As shown in FIG. 15, the partition information 84 and format information 86 are formed as medium information 102 every partition and stored into the buffer 118. In step S3, a check is made to see if the medium information request command has been received from the upper OS 56. When the command is received, the medium information 102 is read out and transferred to the upper apparatus in step S4.

Figure 17:
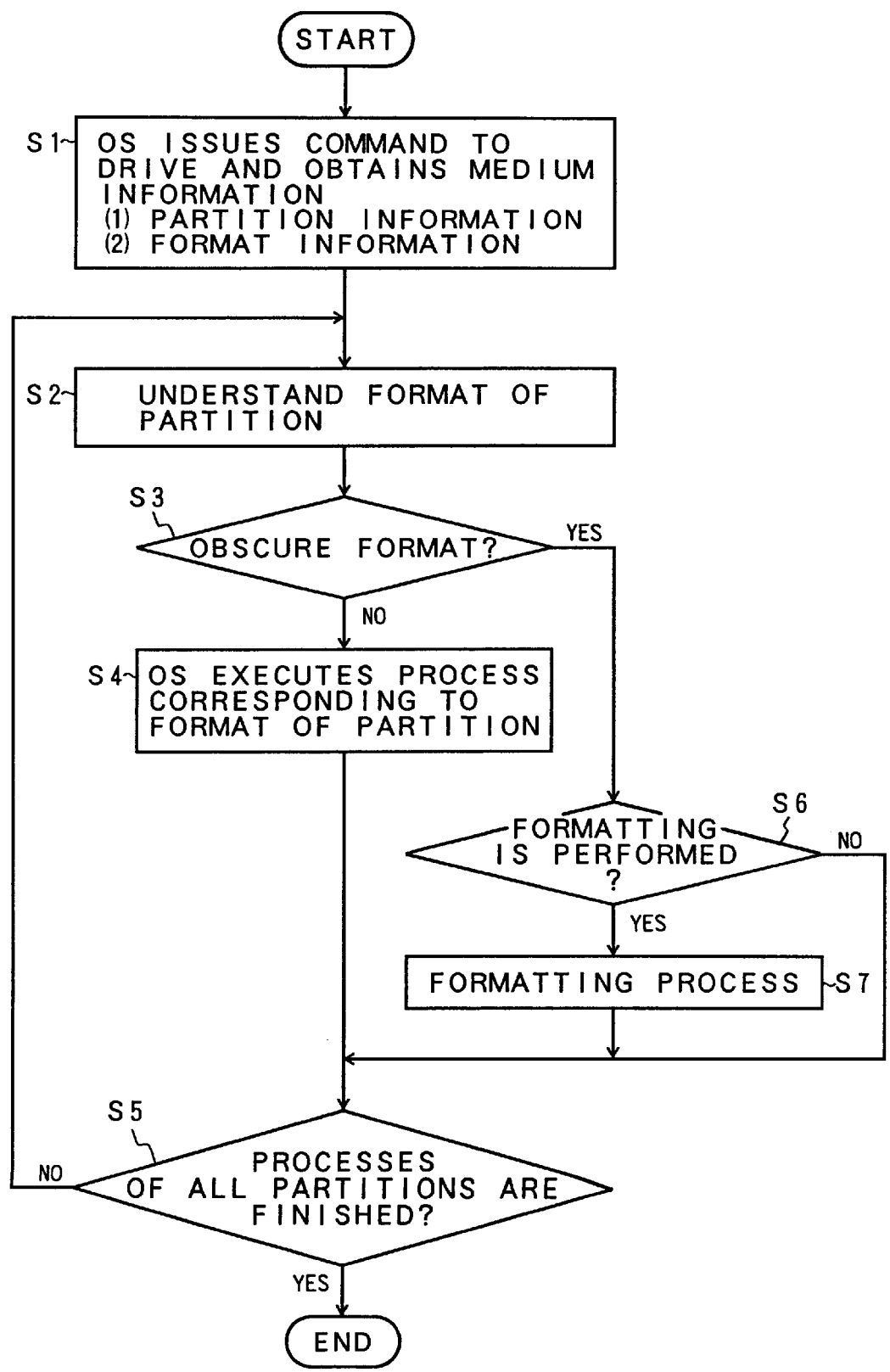
FIG. 17 is a flowchart for the processing operation of an upper OS in FIG. 14.

FIG. 17 is a flowchart for the processing operation on the personal computer 10 side serving as an upper apparatus in case of using the plug-in type MO drive 90 in FIG. 14. When the plug-in detecting unit 96 of the BIOS 32 provided on the personal computer side detects the drive connection based on the insertion of the MO cartridge 22 after the turn-on of the power source of the MO drive 90 which is used by the plug-in, the drive connection is notified to the access processing unit 66 of the OS 56. The processes in FIG. 17 are started. First in step S1, the OS 56 issues the medium information request command to the MO drive 90 and obtains the partition information 84 and format information 86 in FIG. 15 as medium information every partition. In step S2, the format of the partition is understood. If it is determined in step S3 that it is not the obscure format, step S4 follows. The OS executes the process for enabling the access of the MO drive 90 corresponding to the format of the partition. In step S5, a check is made to see if the processes of the OS have been finished with respect to all partitions. If NO, the processing routine is returned to step S2. Similar processes are repeated with regard to the remaining partitions. On the other hand, with regard to the specific partition, if the format is obscure or it is not formatted yet in step S3, step S6 follows. A check is made to see if the formatting is executed. When the formatting process is instructed by a set-up menu or the like, obviously, the designated formatting process is executed in step S7. If the formatting is not instructed, such a partition is held in an unformatted state and the processing routine advances to the next process.

According to the invention as described above, with respect to the case where the drive using the removable medium is built in the computer, when the apparatus power source is turned on, the medium information including at least the format kind is formed on the built-in drive side serving as a recording and reproducing apparatus. The formed medium information is sent in response to the command from the upper apparatus before the bootup process is executed. The medium information can be easily obtained in the upper apparatus without performing any special operation such as reading, analysis, or the like of the medium information. By certainly executing the boot process for many various kinds of formats on the medium side, the upper apparatus can easily cope with them.

As for the case where the drive serving as a recording and reproducing apparatus is plug-in connected to the computer main body by the connector cable or the like and is used, when the power source of the plug-in driver is turned on and the removable medium is inserted, the medium information including at least the format kind is formed. The formed medium information is sent in response to the command from the upper apparatus which received the connection notification of the plug-in driver. In a manner similar to the case of the driver built-in type, the medium information can be easily obtained in the upper apparatus without needing any special operation such as reading, analysis, or the like of the medium. The accessible state of the upper apparatus is established for many various kinds of formats on the medium side. The upper apparatus can easily cope with them.

The above embodiments have been shown and described with respect to the example of using the MO drive as a processing apparatus of the removable medium. The invention is not limited to such an example but can be applied as it is to any other apparatus using a removable medium such as magnetic tape apparatus, CD drive, DVD drive, FD drive, or the like.

Although the ATA interface and the ATAPI interface have been shown as an example of the interface of the MO drive, it will be obviously understood that other various interfaces such as IDE, SCSI, UBS, IEEE1394, and the like can be supported.

Further, the present invention is not limited to the foregoing embodiments but many variations and modifications are included within the purview of the invention without losing the object and advantages of the invention. Further, the invention is not limited by the numerical values of the embodiments.

What is claimed is:

1. A computer system comprising:

a memory apparatus, installed in a system main body, for forming medium information from system information reproduced from a removable medium when a system power source is turned on in a state where a removable medium has been inserted into said memory apparatus, said medium information identifying an access type of the removable medium, said memory apparatus transferring said medium information to a system control in response to a request command from the system control; and the system control sending a command to said memory apparatus when said system power source is turned on, executing a boot process on the basis of said obtained medium information, and establishing an accessible state of said memory apparatus.

2. A computer system according to claim 1, wherein said memory apparatus comprises:

a system information reading unit for reading out prerecorded system information from a predetermined area of the removable medium when the system power source is turned on;

a medium information forming unit for analyzing said system information and forming medium information necessary for the boot process of said system control; and a command processing unit for transferring said medium information to said system control in response to the request command received from said system control when the apparatus power source is turned on.

3. A computer system according to claim 2, wherein said system information reading unit reads out a logic block address of the removable medium and caches said logic block in a buffer, and said medium information forming unit analyzes a head logic block address cached in said buffer and forms said medium information.

4. A computer system according to claim 3, wherein said medium information forming unit divides the removable medium into a plurality of partitions and divisionally forms said medium information for each of said plurality of partitions.

5. A computer system according to claim 3, wherein said medium information forming unit forms bootable information showing whether a bootable program necessary for a boot process of the system control exists on the removable medium, partition information showing a partition area and format information showing a kind of format of said partition when said system power source is turned on.

6. A computer system according to claim 3, wherein the removable medium has a PC/AT corresponding medium format, and when the system power source is turned on, said medium information forming unit forms partition information by analyzing a partition start address, a partition end address, a partition head physical sector, and the total number of partition allocation sectors of the head logic block address of the removable medium, forms format information by analyzing a system indicator of said head logic block address, and further forms boot information by analyzing a boot indicator of said head logic block address.

7. A computer system according to claim 6, wherein said format information is a command number defined by table information of a predetermined PC/AT corresponding format.

8. A computer system according to claim 1, wherein said system control comprises:

a bootup processing unit for obtaining said medium information by sending a medium information request command to said memory apparatus when said system power source is turned on and executes a bootup process on the basis of partition information, format information, and bootable information included in the obtained medium information;

a boot processing unit for executing a boot process by a boot program loaded from said memory apparatus by said bootup processing unit; and an access processing unit for executing an input/output access for said memory apparatus after completion of said boot process.

9. A computer system according to claim 8, wherein said bootup processing unit is realized by a basic input/output system provided for a mother board of said system control, and said boot processing unit and said access processing unit are realized by an operating system of said system control.

10. A computer system according to claim 9, wherein in the case where said memory apparatus supports an ATA interface, when said system power source is turned on, said basic input/output system issues an identify command as a medium information request command.

11. A computer system according to claim 9, wherein in the case where said memory apparatus supports an ATAPI interface, when said system power source is turned on, said basic input/output system issues an inquiry command as a medium information request command.

12. A memory apparatus for reading a removable medium, comprising:

a system information reading unit for reading out system information from a predetermined area of the removable medium when an apparatus power source is turned on in a state where said removable medium has been inserted into the memory apparatus;

a medium information forming unit for analyzing said system information and forming medium information including boot information necessary for a boot process of a system control partition information showing a partition area, and format information showing a kind of format of said partition; and a command processing unit for transferring said medium information to said system control in response to a request command received from the system control when said apparatus power source is turned on.

13. A computer system comprising:

a memory apparatus, externally connected to a system main body wherein said memory apparatus forms medium information from system information reproduced from a removable medium when said medium is inserted into said memory apparatus after an internal power source was turned on, said medium information identifying an access type of the removable medium, said memory apparatus transferring said medium information to a system control in response to a request command from the system control; and the system control sending a command to said memory apparatus when one of:

(i) insertion of a medium into said memory apparatus is detected and said memory apparatus is in an operating state with the internal power source activated, and (ii) the internal power source is activated with the removable medium already inserted in said memory apparatus;

whereby an accessible state of said memory apparatus is established on the basis of the obtained medium information.

14. A computer system according to claim 13, wherein said memory apparatus comprises:

a system information reading unit for reading out prerecorded system information from a predetermined area of the removable medium when the removable medium is inserted;

a medium information forming unit for forming medium information necessary for access of said memory apparatus by said system control by analyzing said system information; and a command processing unit for transferring said medium information in response to said request command received from said system control.

15. A computer system according to claim 14, wherein said system information reading unit reads out a head logic block address of said removable medium and caches into a buffer, and said medium information forming unit forms said medium information by analyzing the head logic block address of said removable medium cached in said buffer.

16. A computer system according to claim 14, wherein said medium information forming unit divides a medium area into one or a plurality of areas and divisionally forms said medium information every partition which defines a logical virtual medium.

17. A computer system according to claim 14, wherein when said removable medium is inserted, said medium information forming unit forms partition information showing a partition area and format information showing a kind of format of said partition.

18. A computer system according to claim 17, wherein said removable medium has a PC/AT corresponding medium format, and when said removable medium is inserted, said medium information forming unit forms the partition information by analyzing a partition start address, a partition end address, a partition head physical sector, and the total number of partition allocation sectors of a head logic block address of said removable medium and, further, forms the format information by analyzing a system indicator of said logic block address.

19. A computer system according to claim 18, wherein said format information is a command number defined by table information of a predetermined PC/AT corresponding format.

20. A computer system according to claim 19, wherein said format information includes an unformatted command number.

21. A computer system according to claim 13, wherein said system control has an access processing unit for obtaining said medium information by sending a request command to said memory apparatus when the connection of said memory apparatus is recognized and for establishing an accessible state for said memory apparatus on the basis of partition information and format information included in the obtained medium information.

22. A computer system according to claim 21, wherein said access processing unit is realized by an operating system of said system control.

23. A computer system according to claim 21, wherein said access processing unit executes a formatting process as necessary and establishes the accessible state in the case where an unformat or an obscure format of the partition which was made active is recognized from said medium information.

24. A computer system according to claim 22, wherein in the case where said memory apparatus supports an ATA interface, said operating system issues an identity command as said medium information request command when the connection of said memory apparatus is recognized.

25. A computer system according to claim 22, wherein in the case where said memory apparatus supports an ATAPI interface, said operating system issues an inquiry command as said medium information request command when the connection of said memory apparatus is recognized.

26. A memory apparatus comprising:

a removable medium which is detachable from said apparatus;

a system information reading unit for reading out prerecorded system information from a predetermined area of the medium when said removable medium is inserted after a power source was turned on;

a medium information forming unit for analyzing said system information and forming medium information including partition information showing a partition area necessary for access to said memory apparatus by a system control and format information showing a kind of format of said partition; and a command processing unit for transferring said medium information to said system control in response to a request command received from said system control.

27. An apparatus for processing a removable medium, communicating with a host main body, where both a memory apparatus and a system control receive power from a given power source, wherein said memory apparatus forms medium information from system information reproduced from the removable medium when said given power source is initially turned on, said medium information identifying an access type of the removable medium, said memory apparatus transferring said medium information to the system control in response to a request command from the system control thereby establishing an accessible state of said memory apparatus.

28. An apparatus for processing a removable medium, communicating with a host main body, a memory apparatus receiving power from a power source independent from an apparatus power source, wherein said memory apparatus forms medium information from system information reproduced from the removable medium when said power source is initially activated, said medium information identifying an access type of the removable medium, said memory apparatus transferring said medium information to a system control in response to a request command from the system control;

the system control sending a command to said memory apparatus when a connection notification based on the medium insertion of said memory apparatus is received in an operating state after an apparatus power source was turned on and for establishing an accessible state of said memory apparatus on the basis of the obtained medium information.

* * * * *

UNITED STATES PATENT AND TRADEMARK OFFICE
CERTIFICATE OF CORRECTION

PATENT NO. : 6,249,864 B1
DATED : June 19, 2001
INVENTOR(S) : Masahiro Ito

Page 1 of 1

It is certified that error appears in the above-identified patent and that said Letters Patent is hereby corrected as shown below:

Title page,
Item [56], References Cited, FOREIGN PATENT DOCUMENTS, please insert the following foreign references:

| | | |
|---|---|---|
| -- S56-092,664 | 7/1981 | Japan |
| S61-262,918 | 11/1986 | Japan |
| S63-055,665 | 3/1988 | Japan |
| H05-241,847 | 9/1993 | Japan |
| H05-258,467 | 10/1993 | Japan |
| H06-068,588 | 3/1994 | Japan |
| H08-249,862 | 9/1996 | Japan |
| H09-259,525 | 10/1997 | Japan |
| H10-069,406 | 3/1998 | Japan |
| H10-143,356 | 5/1998 | Japan -- |

Claim 24,
Line 23, delete "identity" and insert -- identify -- therefor.

Signed and Sealed this

Sixteenth Day of April, 2002

*Attest:*

*Attesting Officer*

JAMES E. ROGAN
*Director of the United States Patent and Trademark Office*